A. B. MORSE.
CLUTCH FOR AUTOMOBILES AND THE LIKE.
APPLICATION FILED NOV. 16, 1909.

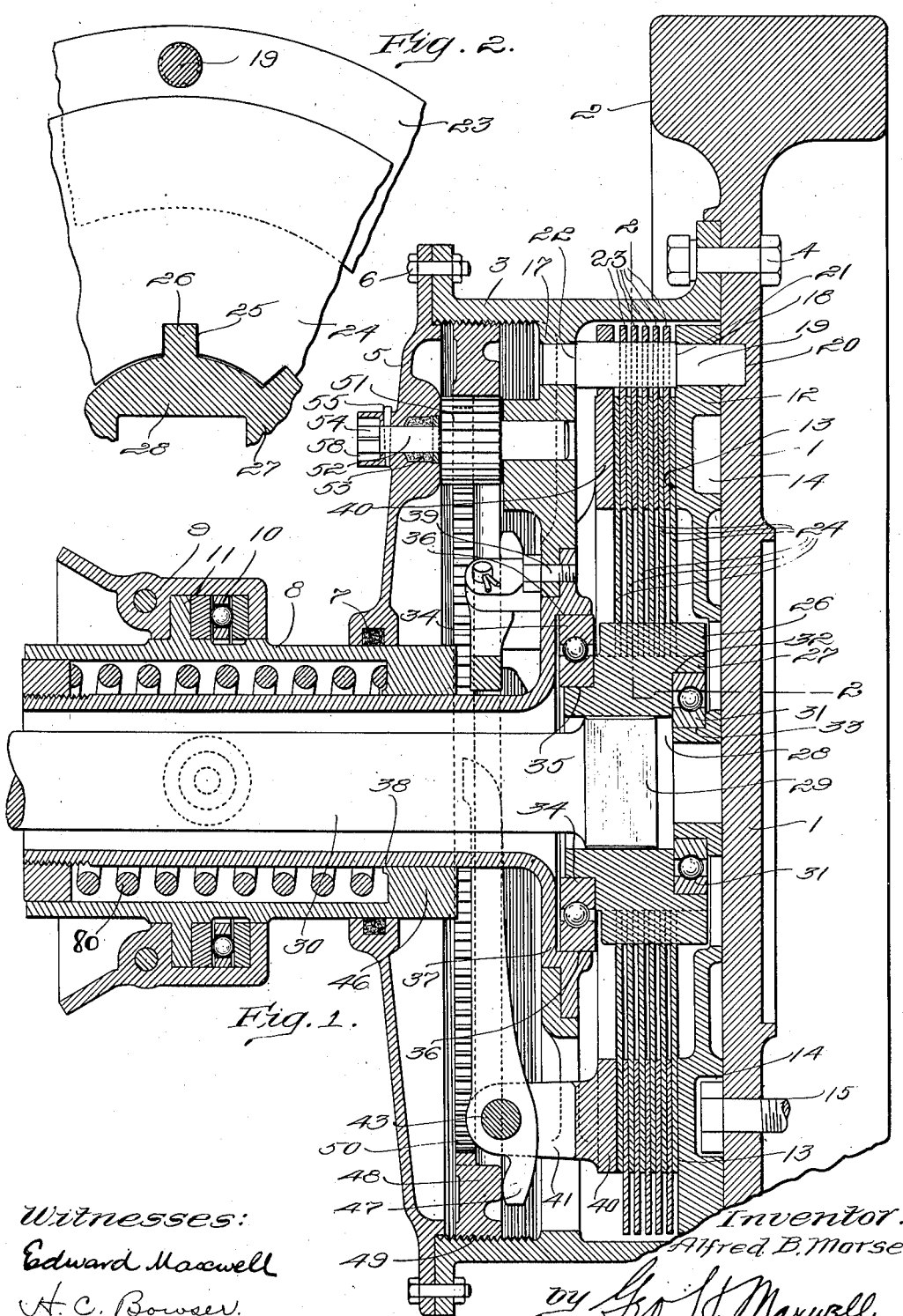

1,016,427.

Patented Feb. 6, 1912.

2 SHEETS—SHEET 2.

Witnesses:
Edward Maxwell
H. C. Bowser

Inventor:
Alfred B. Morse.
by Geo. H. Maxwell
Atty.

UNITED STATES PATENT OFFICE.

ALFRED B. MORSE, OF SOUTH EASTON, MASSACHUSETTS.

CLUTCH FOR AUTOMOBILES AND THE LIKE.

1,016,427.      Specification of Letters Patent.      Patented Feb. 6, 1912.

Application filed November 16, 1909. Serial No. 528,348.

*To all whom it may concern:*

Be it known that I, ALFRED B. MORSE, a citizen of the United States, residing at South Easton, in the county of Bristol and State of Massachusetts, have invented an Improvement in Clutches for Automobiles and the Like, of which the following description, in connection with the accompanying drawings, is a specification, like letters on the drawings representing like parts.

In connection with certain kinds of work, as for instance high speed motors when driven on the road, there is a marked need for a clutch which is not only positive and extremely durable and long lived, but free running at all times, impervious to the entrance of dust and which does not require adjustment or attention excepting at very long intervals. This is especially true in connection with high speed motor car service, where so much depends upon the clutch, both for the safety of the occupants of the car as well as of the car itself. Accordingly it is the object of my present invention to provide a clutch meeting all of the above requirements. To this end I provide a clutch, all of whose mechanism, including the friction parts which constitute the clutch proper, and also the adjusting mechanism and means of lubrication, are so constructed that they are hermetically incased and yet the clutch can be readily operated from the outside, the adjusting means also can be externally operated, and the lubrication supply replenished from the outside, all without removing the casing or cover or dismembering the automobile or any of its driving gear or parts.

Further features of my invention reside in providing special adjusting means whereby the tightening or adjusting is uniform on the internal part of the clutch-operating mechanism, there is no possibility of throwing oil, although the clutch runs in oil, the parts are readily inspected, renewed, assembled, etc.

Figure 3:
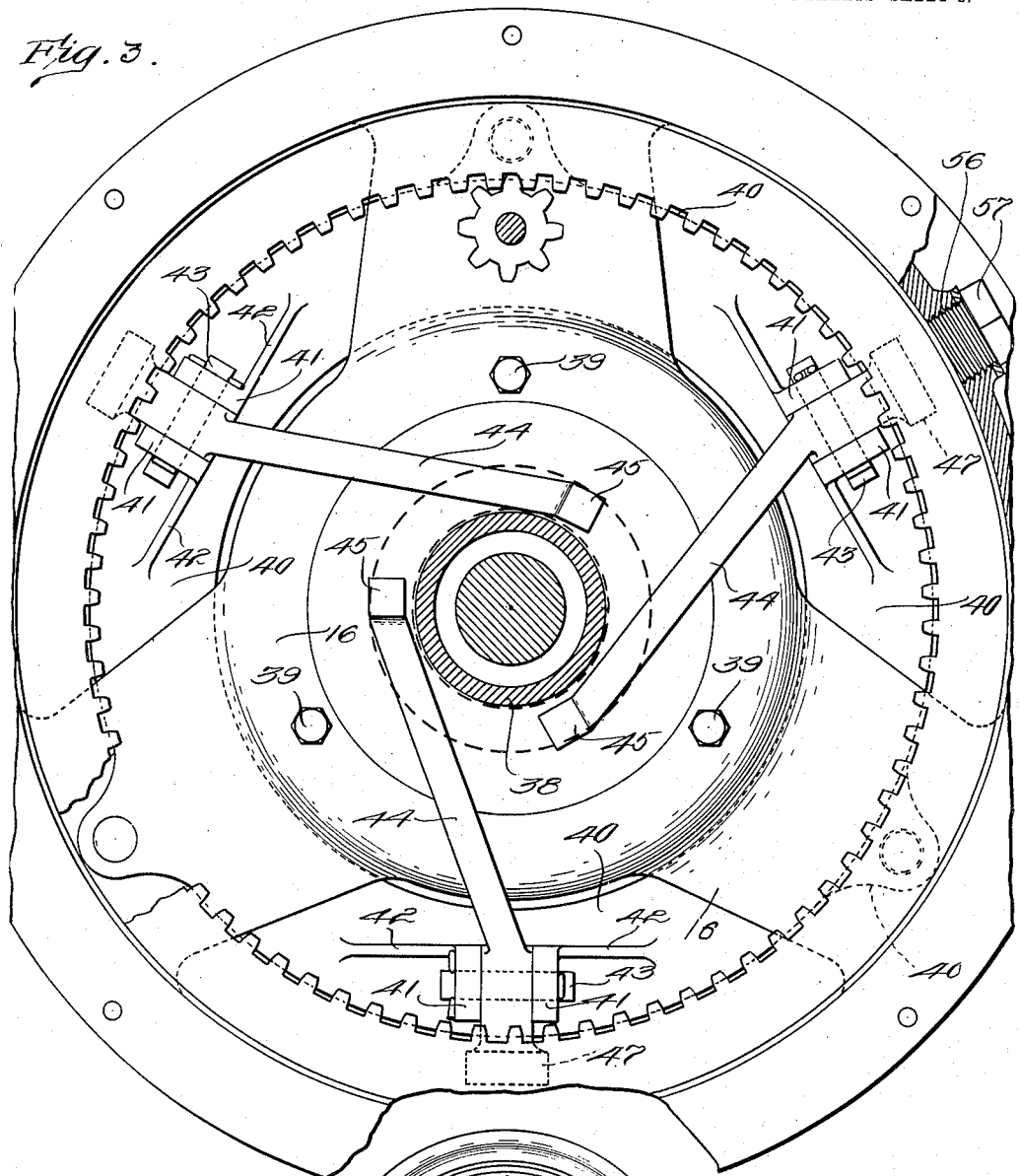
Figure 4:
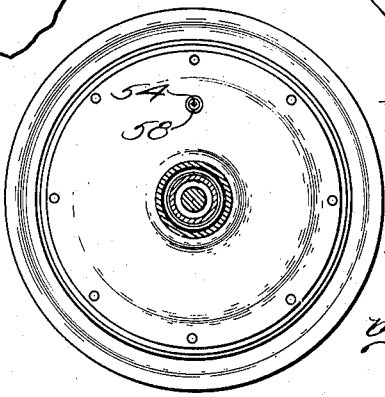

In the drawings, in which I have shown a preferred embodiment of the invention, Figure 1 is a central vertical longitudinal section of the apparatus; Fig. 2 is a transverse sectional detail view of a portion of the internal mechanism taken on the line 2—2 Fig. 1; Fig. 3 is a similar sectional view taken at the front side of the clutch with the cover removed; and Fig. 4 is a view in front elevation of the complete clutch.

The outer part of the clutch, which is connected directly to the engine (in usual or preferred manner, which, not constituting part of my invention, is not shown) comprises a heavy side plate 1 preferably peripherally enlarged at 2 to constitute a fly wheel, an annular rim 3 bolted to said fly wheel at 4 and a front plate 5 bolted to the rim at 6 and herein shown as provided with a packing gland 7 to bear on the movable sleeve 8 which actuates the clutch by means of a spring 80 and usual fork or any other form of actuating lever (not shown) connected to a collar 9 shown as provided with ball bearings 10 to engage a flange 11 of said sleeve. Next to the side or face 1 of the clutch casing I mount a plate or casting 12 having a smooth friction face 13 and preferably containing an annular recess 14 to receive the heads of bolts 15 provided for securing the outer part of the clutch to the engine connection in well known manner. The rim 3 is provided with a preferably integral spider or web-like frame 16 extending from the inner wall thereof about midway from the edges of said rim, said frame 16 being provided with holes 17 in alinement with similar holes 18 in the casting 12, and in said holes are mounted pins 19 which extend into and snugly fit recesses 20 provided therefor in the inner face of the side 1 of the casing, said pins having shoulders 21 fitting against the outer edge of the holes 18 to hold the casting or plate 12 snugly in place, and shoulders 22 fitting against the adjacent edge of the holes 17 to hold the pins immovable when the parts are all clamped together. On these pins are loosely mounted a series of plane annular friction plates 23 free to slide lengthwise of the pins 19 and held against relative rotary motion by said pins. Coöperating with these friction plates 23 are embracing friction plates or disks 24 centrally apertured and provided with notches 25, see Fig. 2, fitting loosely over longitudinal ribs or projections 26 which extend radially from a transmission block or hub 27 which has a square axial opening 28 to fit onto the similar squared end 29 of the power transmission shaft 30 which transmits the power to the driving gear of the vehicle. A ball bearing ring 31 is held between shoulders 32 and 33 provided respectively on said hub and inner hub-like central portion of the casting 12, and a similar ball bearing ring 34 is held between a similar shoulder 35 on said hub 27 and the shoulder 36 of the outwardly turned flange 37 of a sleeve 38 on which the actuating sleeve 8 slides, said flange 37 being secured to the inner edge of the web or frame 16 by bolts 39.

The friction disks, at one end of the series, bear against the flat bearing face 13 of the plate 12 while at the other end of the series they are engaged by a clamping ring 40, from which project pairs of ears 41, three of said pairs being herein shown, see Fig. 3, preferably strongly braced by ribs 42, the internal frame or web 16 being cut away to permit these ears and ribs to project forward the desired distance, and in these ears are pivoted at 43 clamping levers whose long arms 44 extend inwardly, preferably as near the center as possible and preferably as far as practicable, being shown as extending approximately tangentially of the sleeve 38 and having out-turned flat ends 45 to be engaged by the block-like heavy end 46 of the movable clutch-lever actuator sleeve 8. The short arms 47 on the other hand, are made as short as possible so as to get as strong a leverage and hence friction on the coöperating friction plates 23, 24 as possible. These short arms 47 of the clamping levers bear on the inner face of a relatively stationary gear ring 48. This ring not only constitutes the bearing point for the clamping levers but the main portion of the adjusting mechanism, and to this end is made adjustable transversely of the clutch by any suitable means, as by a threaded engagement at 49 with the inner face or rim of the casing, said ring 48 being provided with internal gear teeth 50 which are engaged by a pinion 51 whose shaft 52 passes through a packing gland 53 to the outside of the front face or casing wall 5 where said shaft has a squared end 54 for receiving a socket wrench whenever adjustment of the clutch is required. As this adjustment is seldom required, I prefer to lock said adjusting mechanism positively, except when used, any suitable locking means being provided, a transverse pin 55 being herein shown as convenient for said purpose.

The parts run in oil, a filling plug being provided at any convenient place in the casing, preferably in the rim 3, where I have shown an opening 56 normally closed by a screw plug 57. Fig. 4 best shows the entirely closed, oil-tight nature of the clutch, the adjusting mechanism, which is practically the only part ordinarily needing attention from time to time, being operated externally by a wrench applied to the squared shaft end 54, as clearly shown in said figure, said end being preferably surrounded by a protecting flange 58.

In operation, the steel friction plates 23, 24 run loosely on each other when the engine is running and the shaft 30 not running, but when the operator desires to start the shaft 30, he releases his clutch lever, which permits the spring 80 to move the sleeve 8 lengthwise to the right, Fig. 1, thereby bringing pressure against the ends 45 of the long arms of the clamping levers, whose short arms afford an extremely powerful leverage against the gear ring 48. This powerful leverage is transmitted to the clamping ring 40 uniformly throughout its entire extent by the plurality of clamping levers, thereby pinching the friction plates 23, 24 together with a corresponding pressure, said plates being free to move transversely for said clamping or clutching engagement. All this movement takes place inside of the tight casing, and notwithstanding the high speed at which automobile motors are run, the high centrifugal force cannot throw out the oil because of the absolutely tight peripheral construction of said casing.

Whenever wear is to be taken up or for any other reason it is desired to adjust the parts, the operator does not have to take the clutch to pieces or dismember any of the mechanism of the automobile, but simply applies a socket wrench to the projecting wrench-end of the shaft 52, whose pinion thereby screws in the gear ring 48 to the extent required for the adjustment, all of said adjustment taking place entirely within the casing while the latter remains tightly closed. The adjusting means is not only inside of the casing, and the latter is oil-tight so that it cannot throw out any of the oil by centrifugal action when running, but my mechanism permits the instant adjustment of the clutch whenever desired without any skill or special trouble. This adjustment or tightening of the clutch is moreover uniform, applying an even tightening movement to whatever number of levers may be used in the clutch, my preference being three of said levers.

Moreover, the entire construction of the clutch is simple, readily put together and taken apart, and yet is extremely strong. The disks or friction plates being of steel and preferably a considerable number thereof, renders the clutch powerful and durable, so that it is practicable to depend upon the clutch to a large extent for varying the speed (by letting the clutch slip more or less) without using to so great an extent as commonly the speed-changing gears of the usual driving mechanism.

As already intimated, I regard my invention in a number of respects as broadly new, and have accordingly so defined it in certain of the appended claims, and therefore I wish it understood that I am not limited to the constructional features of the preferred mechanism of the drawings excepting in the particulars specified in the claims.

Having described my invention, what I claim as new and desire to secure by Letters Patent is:

1. In a clutch of the kind described, coöperating clutch members, actuating means for bringing said members together in clutched relation, means for relatively adjusting said actuating means with reference to the clutch members, a casing for the aforesaid mechanism, external operating means for the internal actuating means, and separate external operating means for said internal adjusting means, said two operating means having connections to the actuating and adjusting means respectively extending with a close bearing fit through the casing.

2. A clutch of the kind described, comprising coöperating clutch members, actuating means for bringing said members together in clutched relation, means for adjusting said actuating means with reference to the clutch members, and an inclosing casing for the aforesaid mechanism closed oil tight against the centrifugal escape of oil from said mechanism, external operating means for said internal actuating means and external operating means for said internal adjusting means having connections to the actuating and adjusting means respectively extending through the casing with a close bearing fit therewith.

3. In a clutch of the kind described, coöperating clutch members, actuating means for bringing said members together in clutched relation, means for adjusting said actuating means relative to the clutch members, including a rotary part, a casing inclosing the aforesaid mechanism, external operating means for the internal actuating means, and a shaft extending from said rotary part through said casing for operating said clutch-adjusting means.

4. A clutch of the kind described, comprising coöperating clutch members, actuating means for bringing said members together in clutched relation, means for adjusting said actuating means relative to the clutch members, including a rotary part, an inclosing casing for the aforesaid mechanism, closed oil-tight against the centrifugal escape of oil from said mechanism, external operating means for said internal actuating means, and a shaft extending from said rotary part through said casing for operating said clutch-adjusting means, said casing having an oil-tight bearing for said shaft.

5. A clutch of the kind described, comprising coöperating clutch members, actuating means for bringing said members together in clutched relation, means for adjusting said actuating means relative to the clutch members, including a rotary part, an inclosing casing for the aforesaid mechanism, closed oil-tight against the centrifugal escape of oil from said mechanism, external operating means for said internal actuating means, and a wrench shaft extending from said rotary part through said casing in position to receive a wrench at its outer end, said casing having an oil-tight bearing for said shaft.

6. In a clutch of the kind described, an inclosing rotary casing, one clutch member mounted within said casing to rotate therewith, a coöperating clutch member also mounted within the casing, means extending from said coöperating clutch member externally of the casing for transmitting motion when said two clutch members are engaged, actuating means also inclosed within the casing for bringing said two clutch members together, external operating means for said actuating means, and means for adjusting said actuating means relative to the clutch members mounted within said casing, including an internally toothed gear mounted in threaded engagement with the inner peripheral wall of said casing, and a relatively stationary pinion meshing with said gear for turning it in its threaded bearing on the casing.

7. A clutch of the kind described, comprising an inclosing rotary casing, oil-tight against the escape of oil from within under centrifugal action, one clutch member mounted within said casing to rotate therewith, a coöperating clutch member also mounted within said casing, means extending from said coöperating clutch member externally of the casing for transmitting motion when said two clutch members are engaged, actuating means also inclosed within said casing for bringing said two clutch members together, external operating means for said actuating means, and clutch-adjusting means mounted within said casing, including an internally toothed gear mounted in threaded engagement with the inner peripheral wall of said casing, and a relatively stationary pinion meshing with said gear for turning it in its threaded bearing on the casing.

8. A clutch of the kind described, comprising coöperating clutch members, levers for bringing said members together in clutched relation, clutch-adjusting mechanism, including a threaded part having engagement with said levers, and a relatively stationary support in which said threaded part is screwed for adjusting movement toward said clutch members, and means for rotating said threaded part in said stationary part to operate said levers.

9. A clutch of the kind described, comprising coöperating clutch members, levers for bringing said members together in clutched relation, clutch-adjusting mechanism, including an externally threaded gear ring for adjusting the effective movement of said levers with relation to said clutch members, a support for said threaded ring outside of the latter internally threaded to receive said ring, and a relatively stationary pinion engaging said gear ring for screwing it in and out with relation to its threaded support.

10. A clutch, comprising coöperating clutch members, actuating means for bringing said members together in clutched relation and having a lever interposed therein, said lever having a pivot support and also a fulcrum point and means for adjusting the fulcrum point of said lever to constitute clutch-adjusting means.

11. A clutch, comprising coöperating clutch members, actuating means for bringing said members together in clutched relation consisting of an operator slidable on a member of the clutch, pivoted levers engaged thereby having engagement with the clutch members, and also having an adjustable fulcrum for said levers constituting clutch-adjusting means.

12. A clutch, comprising coöperating clutch members, actuating means for bringing said members together in clutched relation, including a plurality of actuating levers pivotally mounted adjacent their outer ends and having their long arms extend inwardly approximately tangentially of the central axis of the clutch, means for engaging and pressing upon the inner ends of said long arms for simultaneously turning the levers on their pivots into clutch-operating position, and a normally stationary adjusting ring positioned for the extreme outer ends of the levers to fulcrum against.

13. A clutch, comprising coöperating clutch members, actuating means for bringing said members together in clutched relation and having a lever interposed therein, a normally stationary adjustable ring for said lever to fulcrum against and arranged to constitute an adjustable backing for said actuating means, and means to lock said adjusting ring positively in different adjusted positions.

In testimony whereof, I have signed my name to this specification, in the presence of two subscribing witnesses.

ALFRED B. MORSE.

Witnesses:
M. J. SPALDING,
EDWARD MAXWELL.